No. 673,995. Patented May 14, 1901.
A. BARDET.
PREPARATION OF RYE OR LIKE CEREALS.
(Application filed Jan. 7, 1901.)
(No Model.) 2 Sheets—Sheet 1.
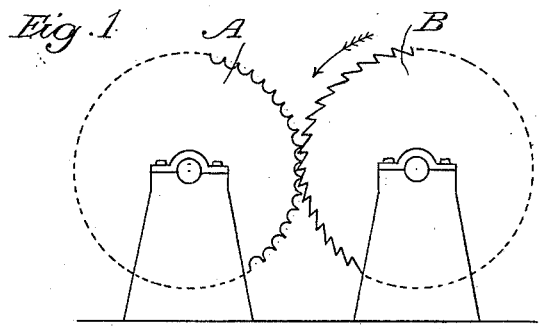
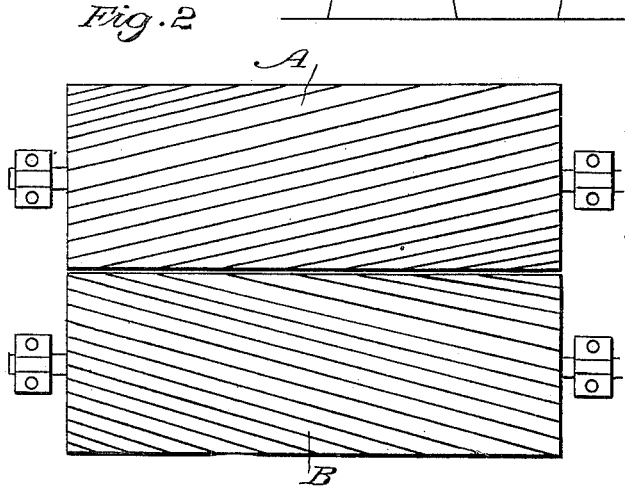
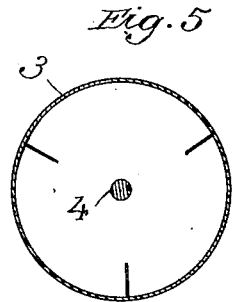
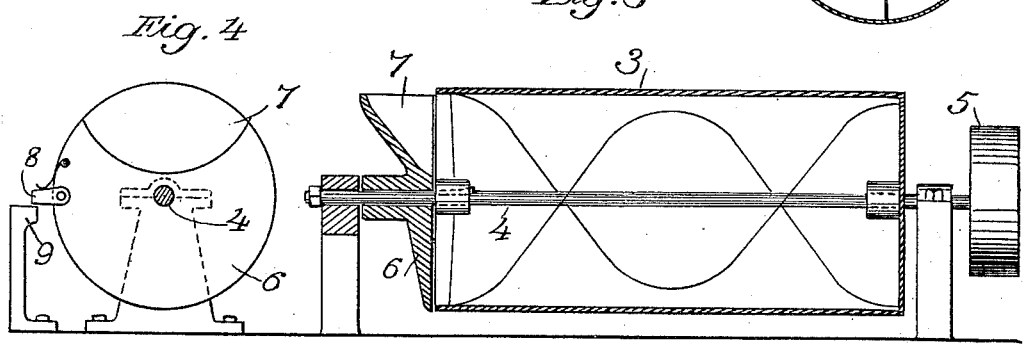

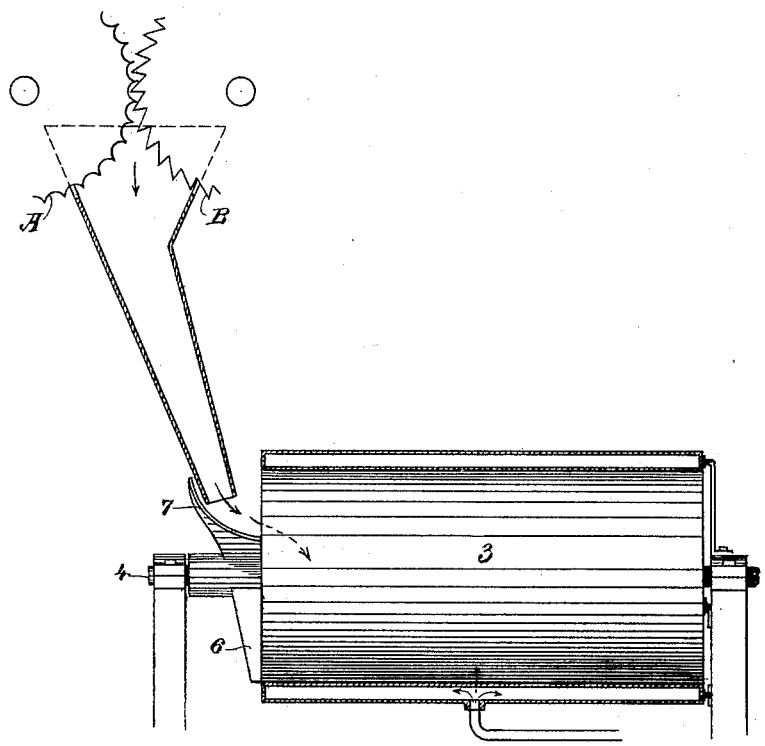

UNITED STATES PATENT OFFICE.

ALEXANDER BARDET, OF SAN FRANCISCO, CALIFORNIA.

PREPARATION OF RYE OR LIKE CEREALS.

SPECIFICATION forming part of Letters Patent No. 673,995, dated May 14, 1901.

Application filed January 7, 1901. Serial No. 42,336. (No specimens.)

*To all whom it may concern:*

Be it known that I, ALEXANDER BARDET, a citizen of the United States, residing in the city and county of San Francisco, State of California, have invented an Improvement in the Preparation of Rye and Like Cereals; and I hereby declare the following to be a full, clear, and exact description of the same.

My invention relates to the preparation of rye and other cereals or like products for alimentary purposes.

It consists in preparing the cereal or grain substantially in the manner hereinafter described, and pointed out in the claims.

The operation may be carried on by any suitable apparatus for the purpose.

In the accompanying drawings, Figure 1 is an end view of cutting-rolls. Fig. 2 is a side view of the rolls. Fig. 3 is a longitudinal section of a heating and separating cylinder. Fig. 4 is an end view showing the head and feed and discharge opening. Fig. 5 is a transverse section of the cylinder. Fig. 6 is a view illustrating the steps of the process in sequence.

A and B are rollers, one of which is corrugated, so as to form spiral depressions from end to end. The other is serrated in like spiral manner, so that the corrugations of one and the spiral serrations of the other converge toward each other during the revolution of the rollers. The serrations are similar in cross-section to the teeth of a ratchet, as plainly shown, and these serrations are sufficiently sharp on the edges to cut the grain into small particles, the grain being held in place by the grooved corrugations of the other roller. By this operation the rye or other grain is cut into small angular particles, and in this condition it is introduced into a roasting-cylinder 3, having spiral flights within it which serve to lift and drop the material within the cylinder during its rotation and to alternately transfer it from one end to the other. Heat is applied to the cylinder in any suitable or well-known manner either by the action of steam or hot air within an annular inclosing jacket or by the direct action of heat, as may be desired. The cylinder is mounted upon a shaft 4 and is revolved by means of a pulley 5 or other equivalent driving mechanism. One head 6 of the cylinder fits the cylinder sufficiently to close the end, but allows the cylinder to revolve independent of the head, the latter being held stationary. The upper part of this head forms a hopper, as at 7, through which the material may be introduced into the cylinder, and during the operation this hopper remains in the upper part of the head. The action of the heat upon the contents of the cylinder produces a sort of steam or vapor which, in conjunction with the heat and the attrition of the particles, acts to disengage and separate the outer skin or bran from the grain and relieve it of a certain undesirable principle contained in the bran. There is sufficient draft or discharge through the hopper-opening to carry off most or all of this bran and to leave the grain in a decorticated condition. When it is desired to discharge the charge from the cylinder, the head 6 is turned about its axle-support and brought into position with the hopper 7 at the lower portion, and as it connects directly with the cylinder the action of the spiral flights within the latter will gradually discharge it from the cylinder, after which the head may be returned to its normal position and another charge introduced.

In order to retain the head with the hopper in either the upright or reversed position, I have shown a suitable latching device, as at 8, consisting of an arm or lug, and catches at some fixed point within the line of its revolution, as at 9, so that it may be checked and held in either position without being moved by the revolution of the cylinder.

Having thus described my invention, what I claim as new, and desire to secure by Letters Patent, is—

1. The preparation and decortication of rye and like cereals as a food product, consisting in first reducing the grain into small particles and then subjecting the particles to heat and agitation whereby the combined action of the heat and the attrition of the particles separate the skin or bran from the grain.

2. The process of preparing rye and like cereals, consisting in first subjecting the grain to revolving cutting-cylinders by which the grain is cut into small angular fragments, then charging the grain thus cut into a revolving cylinder and applying heat thereto, whereby the skin or bran is separated from the grain and discharged from the cylinder.

In witness whereof I have hereunto set my hand.

ALEXANDER BARDET.

Witnesses:
S. H. NOURSE,
JESSIE C. BRODIE.